United States Patent
Gawlik et al.

(10) Patent No.: US 9,969,626 B2
(45) Date of Patent: May 15, 2018

(54) TECHNIQUES FOR INCREASING THE EVAPORATION RATE IN EVAPORATION PONDS

(71) Applicant: SOLAR MULTIPLE, LLC, Golden, CO (US)

(72) Inventors: Keith Gawlik, Arvada, CO (US); Eric Reitze, Golden, CO (US); Diego A. Arias, Denver, CO (US); William Hargett, Broomfield, CO (US)

(73) Assignee: SOLAR MULTIPLE, LLC, Golden, CO (US)

( * ) Notice: Subject to any disclaimer, the term of this patent is extended or adjusted under 35 U.S.C. 154(b) by 317 days.

(21) Appl. No.: 14/732,194

(22) Filed: Jun. 5, 2015

(65) Prior Publication Data

US 2015/0353378 A1    Dec. 10, 2015

Related U.S. Application Data

(60) Provisional application No. 62/007,936, filed on Jun. 5, 2014, provisional application No. 62/116,413, filed on Feb. 14, 2015.

(51) Int. Cl.
*C02F 1/10* (2006.01)
*C02F 1/14* (2006.01)
(Continued)

(52) U.S. Cl.
CPC .............. *C02F 1/10* (2013.01); *B01D 1/0005* (2013.01); *B01D 1/0017* (2013.01); *B01D 1/0035* (2013.01); *B01D 1/0058* (2013.01); *B01D 1/14* (2013.01); *C02F 1/048* (2013.01); *C02F 1/14* (2013.01); *C02F 1/74* (2013.01); *C02F 2103/08* (2013.01); *C02F 2103/10* (2013.01);
(Continued)

(58) Field of Classification Search
CPC ... C02F 1/048; C02F 1/10; C02F 1/14; B01D 1/0058; B01D 1/0017; B01D 1/0035; B01D 1/0005; B01D 1/14; F24J 2/0472
See application file for complete search history.

(56) References Cited

U.S. PATENT DOCUMENTS

| 4,110,172 A | * | 8/1978 | Spears, Jr. | ................. | C02F 1/10 126/908 |
| 4,613,409 A | * | 9/1986 | Volland | .................... | B01D 1/04 126/561 |

(Continued)

*Primary Examiner* — Jonathan Miller
(74) *Attorney, Agent, or Firm* — Robert G. Crouch; Marsh Fischmann & Breyfogle LLP

(57) ABSTRACT

A system for enhancing evaporation from a body of liquid, in which heated or unheated air is distributed through a pipe network that is submerged in the evaporation pond, with the air being injected into the pond to produce air bubbles in the water. The air may be combined with water prior to the injection. The water may be drawn from the pond. The air and/or water may be heated by solar heating, electric heating, fuel burning, or waste heat recovery. In the case of solar heating, any of a transpired solar collector, a packed bed solar collector, a flat plate solar collector, a linear Fresnel collector, a parabolic solar collector, a paraboloid dish solar collector, or other could be used. The pipe network may be maintained at a desired depth below the upper surface of the pond by various means, with one example being flotation devices, from which the pipe network is suspended.

15 Claims, 9 Drawing Sheets

(51) Int. Cl.
  *B01D 1/00*    (2006.01)
  *B01D 1/14*    (2006.01)
  *C02F 1/04*    (2006.01)
  *C02F 1/74*    (2006.01)
  *C02F 103/10*  (2006.01)
  *C02F 103/08*  (2006.01)

(52) U.S. Cl.
  CPC ........... *Y02A 20/128* (2018.01); *Y02A 20/212* (2018.01); *Y02P 70/34* (2015.11); *Y02W 10/37* (2015.05)

(56) References Cited

U.S. PATENT DOCUMENTS

| | | | | |
|---|---|---|---|---|
| 5,342,482 | A * | 8/1994 | Duesel, Jr. | B01D 1/14 159/16.2 |
| 6,814,866 | B1 * | 11/2004 | Potts | B09C 1/002 210/170.08 |
| 8,136,797 | B2 * | 3/2012 | Duesel, Jr. | B01D 1/0058 261/123 |
| 8,623,174 | B1 * | 1/2014 | Duesel, Jr. | B01D 1/14 159/16.1 |
| 8,808,497 | B2 * | 8/2014 | Duesel, Jr. | B01D 1/0005 159/16.1 |
| 2011/0303367 | A1 * | 12/2011 | Panz | B01D 1/14 159/16.2 |
| 2012/0247944 | A1 * | 10/2012 | Milani | B01D 1/04 203/92 |
| 2013/0248122 | A1 * | 9/2013 | Duesel, Jr. | B01D 1/0005 159/16.1 |
| 2014/0166211 | A1 * | 6/2014 | Duesel, Jr. | B01D 1/14 159/46 |
| 2014/0216033 | A1 * | 8/2014 | Duesel, Jr. | C02F 1/048 60/643 |

\* cited by examiner

TECHNIQUES FOR INCREASING THE EVAPORATION RATE IN EVAPORATION PONDS

CROSS-REFERENCE TO RELATED APPLICATIONS

This application claims priority from U.S. Provisional Patent Application No. 62/007,936, filed Jun. 5, 2014, and also claims priority from U.S. Provisional Patent Application No. 62/116,413, filed Feb. 14, 2015, which are hereby incorporated by reference in their entireties.

BACKGROUND

Many industrial processes (e.g., harvesting salt from seawater, desalination plants, separating produced water from mine tailings, oil fracking processes, and other similar processes that produce waste water) generate large volumes of contaminated water that cannot be disposed of by draining it into the local watershed. The large volume of water combined with these contaminants makes it difficult/expensive to transport the waste water to a treatment facility. Removing the water from the contaminants would facilitate disposal by reducing the amount of waste needing to be managed. In other applications, water removal can also be used to attain a desirable good such as sea salt. In these situations, it is important to have an efficient and low cost method of removing the water to minimize production costs.

To address these issues, evaporation ponds are commonly used to concentrate materials by removing water. Evaporation ponds are artificial ponds with very large surface areas that expose a liquid mixture to air, solar radiation, and ambient temperatures. Exposure to ambient conditions causes the water to evaporate and contaminants or other materials that had been mixed with the water to be left in the pond. However, evaporation from these ponds is highly dependent on the ambient conditions. In order to have a sufficiently high evaporation rate, the surface area of the ponds needs to be very large, creating ponds that take up vast amounts of space. The large size of the ponds makes them expensive to construct and places constraints on where they can be built. Additionally, since the evaporation rate is related to the ambient temperature, little to no evaporation may take place in cold conditions.

In order to increase the evaporation rate from such ponds, sprayers can be used (where it is permitted) to shoot a mist of the pond water into the air. However, any contaminants in the pond are also sprayed into the air, and can be dispersed into the surrounding environment. In addition, sprayer systems have expensive operational costs due to the large power consumption required by the water pumps to create the water mist, and due to the required maintenance caused by scaling that develops on the spray nozzles.

What is needed, therefore, are improved techniques for increasing the evaporation rate of water from evaporation ponds.

SUMMARY

Disclosed herein is a method for enhancing the evaporation rate of water in an evaporation pond having an upper surface. The method includes drawing in ambient air, the ambient air having an ambient air temperature; raising the temperature of the air to a temperature relatively higher than the ambient air temperature; and injecting the air at the relatively higher temperature into the evaporation pond at one or more points in the evaporation pond that are below the upper surface of the evaporation pond.

The temperature of the air may be raised via solar heating. The temperature of the air may be raised by passing the air through a transpired solar collector. The temperature of the air may be raised by passing the air through a packed bed solar collector. The temperature of the air may be raised by passing the air through a parabolic solar collector. The temperature of the air may be raised by passing the air through a linear Fresnel solar collector. The temperature of the air may be raised via electrical heating. The temperature of the air may be raised via heating by burning fuel. The temperature of the air may be raised via waste heat recovery.

The method may further include mixing the raised temperature air with water before injecting it into the evaporation pond. The mixed air and water may be injected into the evaporation pond via a liquid pump. The mixed air and water may be injected into the evaporation pond at a plurality of points in the evaporation pond by a pipe network. The pipe network may be maintained at a fixed depth in the evaporation pond below the upper surface of the evaporation pond. The pipe network may be maintained at the fixed depth by one or more flotation devices associated therewith. The fixed depth of the pipe network below the upper surface of the evaporation pond may be between 1 and 3 feet. The water that is mixed with the air may be drawn from the evaporation pond.

The air may be injected into the evaporation pond via an air pump. The air may be injected into the evaporation pond at a plurality of points in the evaporation pond by a pipe network. The pipe network may be maintained at a fixed depth in the evaporation pond below the upper surface of the evaporation pond. The pipe network may be maintained at the fixed depth by one or more flotation devices associated therewith. The fixed depth of the pipe network below the upper surface of the evaporation pond may be between 1 and 3 feet.

Also disclosed is a method for enhancing the evaporation rate of water in an evaporation pond. The method includes drawing in ambient air, the ambient air having an ambient air temperature; raising the temperature of the air to a temperature relatively higher than the ambient air temperature; combining the air at the relatively higher temperature with water; and injecting the combined air and water into the evaporation pond at one or more points in the evaporation pond that are below the upper surface of the evaporation pond.

Also disclosed is a method for enhancing the evaporation rate of water in an evaporation pond. The method includes drawing in ambient air, the ambient air having an ambient air temperature; and injecting a fluid including the air into the evaporation pond at one or more points in the evaporation pond that are below the upper surface of the evaporation pond, wherein the fluid has a temperature that is relatively higher than the ambient air temperature.

BRIEF DESCRIPTION OF THE DRAWINGS

The disclosure herein is described with reference to the following drawings, wherein like reference numbers denote substantially similar elements.

DETAILED DESCRIPTION

Figure 1:
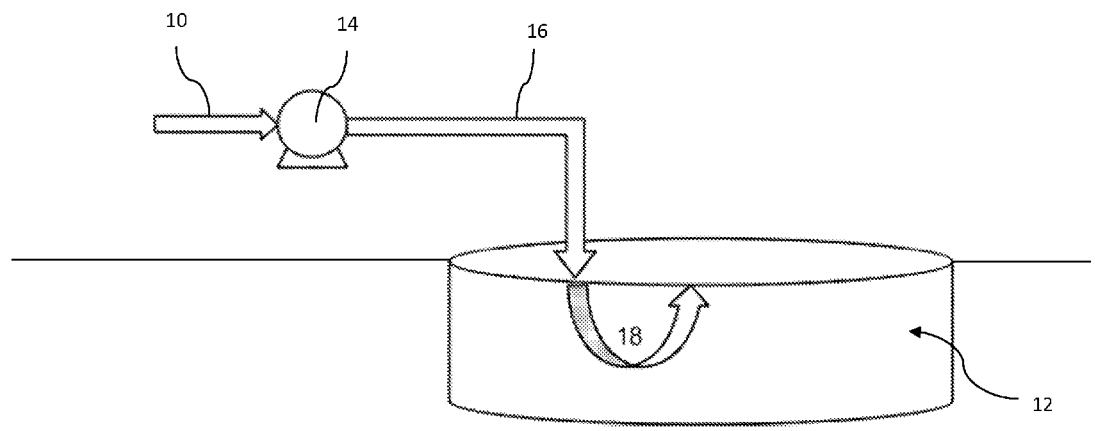
FIG. 1 schematically illustrates an evaporation system with air flow injection.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Disclosed herein are techniques and systems related to evaporation systems from bodies of liquid in which the evaporation rate is enhanced by pumping air into the liquid. This may be accomplished with a pipe/conduit network that is submerged in the body of liquid. The air that is delivered into the body liquid increases the evaporation rate. The incoming air may be heated in some way (e.g., a solar collector, a fossil fuel burner, an electric heater, or a waste heat recovery system). An air pump may be used or a liquid pump may be used to drive the air into the system, and reduce the power consumption related to air pumping.

FIG. 1 shows the basic elements of the proposed enhanced evaporation system. Air 10 flows through a blower or compressor 14 and the pressurized air 16 flows into a flow distribution system 18 submerged in a body of liquid. When the air is delivered into the body of liquid, it forms bubbles. This process of injecting air bubbles into a still body of liquid increases the evaporation rate of the liquid by increasing the area available for heat and mass transfer.

Figure 2:
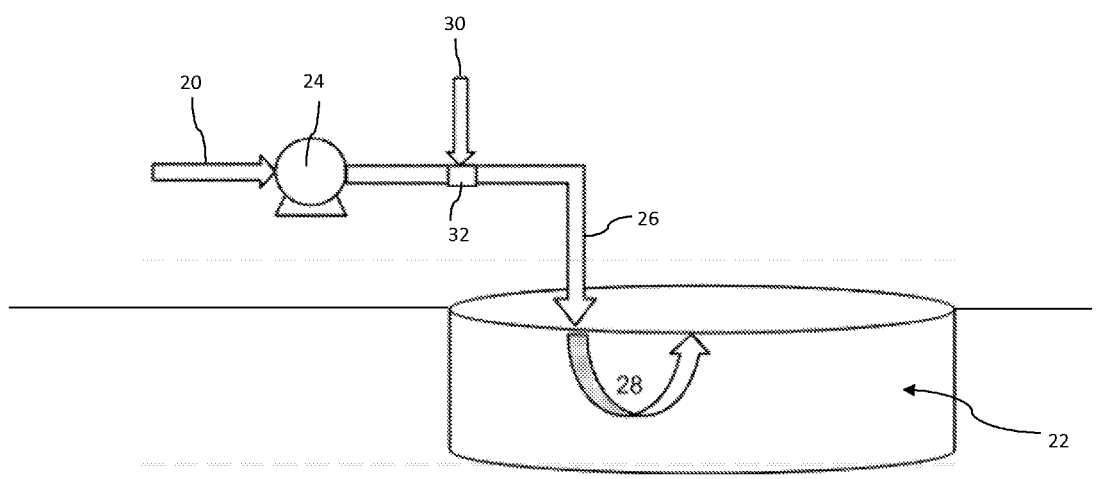
FIG. 2 schematically illustrates an evaporation system with air and liquid flow injection.

FIG. 2 shows an enhanced evaporation system in which a liquid 20 flows through a pump 24 into a mixer device 32 where air 30 enters or is drawn into the system, creating a mixture of liquid and air 26. This air and liquid mixture 26 is delivered to a body of liquid 22, through a flow distribution system 28. By using the mixer device 32, it is possible to use a liquid pump instead of a blower or compressor, and reduce the power consumption related to pumping air into the system. The liquid 20 may be recirculated from the body of liquid or may come from another stream.

Figure 3:
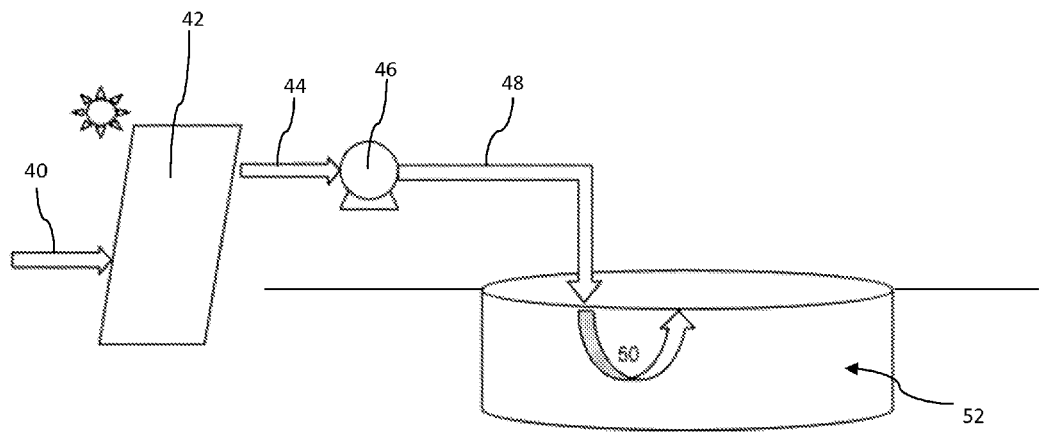
FIG. 3 schematically illustrates an evaporation system with heated air injection.

FIG. 3 shows an enhanced evaporation system, in which air 40 flows through a solar collector 42. The heated air 44 flows through a blower or compressor 46 where the air 48 is driven into a body of liquid 52, through a flow distribution system 50. The solar collector may be of any appropriate kind: a transpired solar collector, a packed bed solar collector, a flat plate solar collector, a linear Fresnel collector, a parabolic solar collector, a paraboloid dish solar collector, a fossil fuel burner, an electric heater, a waste heat recovery device, or other. If an electrical heater is used, the electricity may come from a photovoltaic panel, from the grid, from a generator, or other source.

Figure 4:
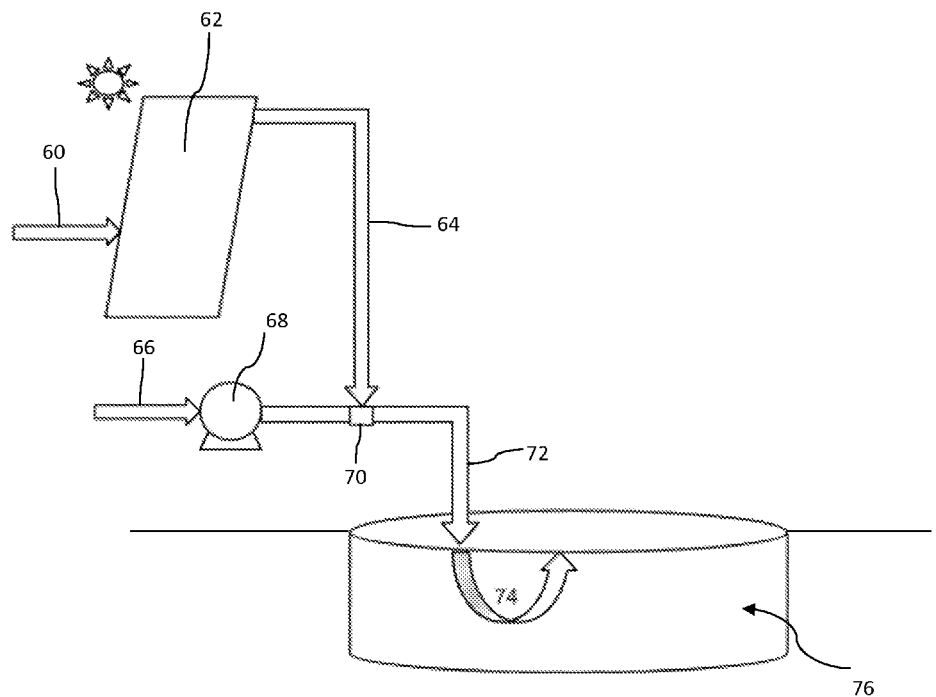
FIG. 4 schematically illustrates an evaporation system with air and liquid flow injection.

FIG. 4 shows an enhanced evaporation system in which a liquid 66 flows through a pump 68, into a mixer device 70. Air 60 flows through a solar collector 62, and the heated air 64 enters the mixer device 70, creating a mixture of liquid and air 72. This mixture 72 is delivered to a body of liquid 76, through a flow distribution system 74. The solar collector may be of any appropriate kind.

Figure 5:
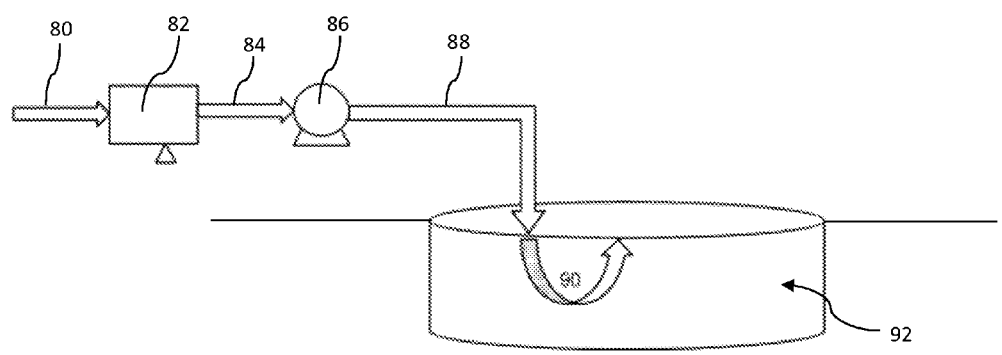
FIG. 5 schematically illustrates an evaporation system with heated air injection.

FIG. 5 shows an enhanced evaporation system, in which air 80 flows through a heating device 82. The heated air 84 flows through a blower or compressor 86 where the air 88 is driven into a body of liquid 92, through a flow distribution system 90. The heating device may be any appropriate kind.

Figure 6:
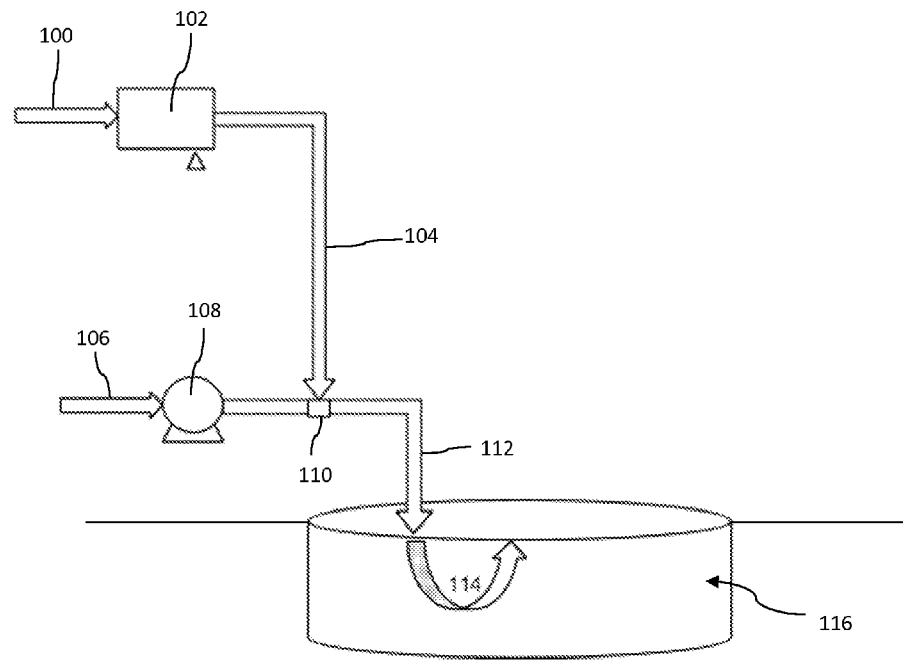
FIG. 6 schematically illustrates an evaporation system with air and liquid flow injection.

FIG. 6 shows an enhanced evaporation system in which a liquid 106 flows through a pump 108, into a mixer device 110. Air 100 flows through a heating device 102, and the heated air 104 enters the mixer device 110, creating a mixture of liquid and air 112. This mixture 112 is delivered to a body of liquid 116, through a flow distribution system 114. The heating device may be any appropriate kind.

Figure 7:
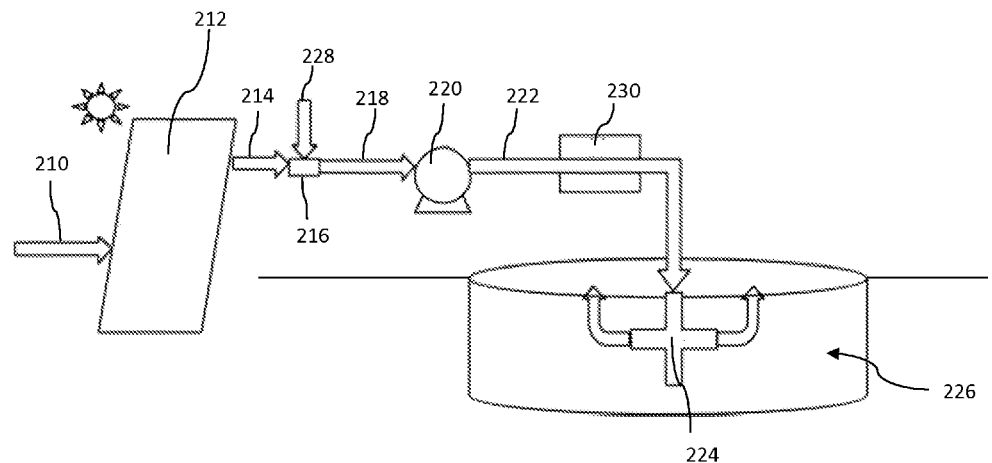
FIG. 7 schematically illustrates an evaporation system with transpired solar collectors and air flow injection.

FIG. 7 shows a solar heating evaporation system. Ambient air 210 flows through one or more transpired solar collectors 212, where solar radiation increases the temperature of the air. The heated air flows into at least another pipe 214, and into at least one flow mixing valve 216. The heated air from the mixer valve travels through one or more pipes 218 and into one or more blowers or fans 220. The heated air then flows through at least one pipe 222 and into one or more air distribution systems 224. Such an air distribution system may be submerged in a body of liquid 226. When the hot air is delivered into the body of liquid, it forms bubbles. This process of injecting air bubbles into a still body of liquid increases the evaporation rate of the liquid by increasing the area available for heat and mass transfer, and by adding air that is at a higher temperature than the body of liquid. Another stream of air 228 may selectively enter the system through the flow mixing valves 220. Such mixing valves allow for a few modes of operation: (1) use air from the transpired solar collectors 212; (2) use air from an additional airstream 228; or (3) use both sources of air 212 and 228.

Mode of operation 1 may be advantageous when there is solar radiation, so that the solar radiation increases the temperature of the air 210 that passes through the collector 212. Mode of operation 2 may be advantageous at night, or when there is no solar radiation during the day, as it allows for bringing air 228 into the body of liquid, without the parasitic power consumption of passing air through the solar collector. This mode of operation could have the additional benefit if other means of heating air are available, such as waste heat, fossil fuels, biomass, biofuels, or electric heating, which may preheat the air 228.

The system may also include a heater device 230 to increase the temperature of the air traveling through the pipes 222 downstream of the fans or blowers 220. The heater 230 may be an electric heater, a fossil-fired heater or a waste heat recovery heat exchanger. In one example, this heater 230 may be used when unheated air is drawn in via air stream 228.

The solar collector 212 may be an unglazed, transpired solar collector, with a porous absorber material. Alternatively, the solar collector may be a glazed, transpired solar collector. Alternatively, the absorber material may be a perforated metal surface. The transpired solar collector may include a dark-colored, perforated façade installed on a south-facing wall of a building or other structure. An added fan or an existing ventilation system may draw ventilation air into a system through the perforated absorber plate on the façade.

In one embodiment, some of the main elements of the air distribution system may float in the body of liquid, or include a floating device. This floating device may allow the air distribution system to be submerged in the body of liquid, while the distance between the liquid surface and the place where air from the air distribution system 224 enters in contact with the liquid is controlled. Thanks to this floating characteristic of the floating device, the air distribution system 224 moves up or down automatically as the liquid level changes.

Figure 8:
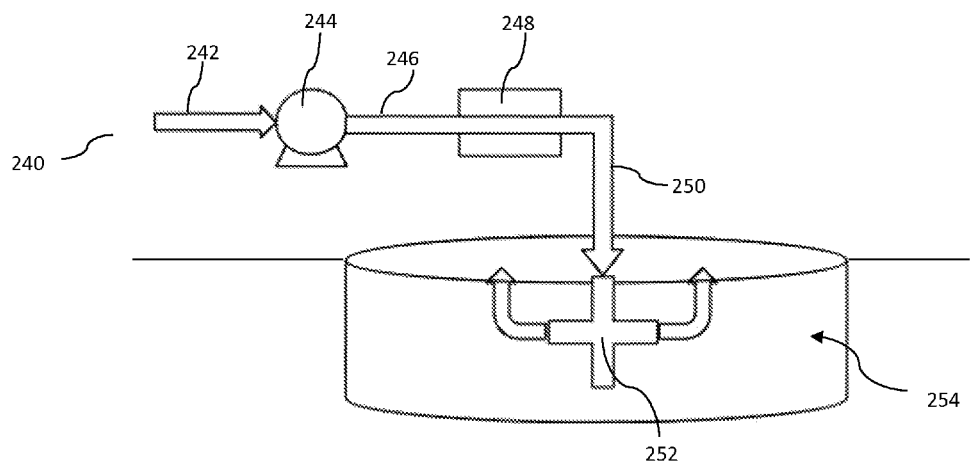
FIG. 8 schematically illustrates an evaporation system with heater and air flow injection.

FIG. 8 shows another embodiment in which the heat input is provided by a heater only. Ambient air 240 enters the system through one or more pipes 242, and into one or more blowers or fans 244. The air flows through one or more pipes 246 and into one or more heaters 248. Such heater 248 increases the temperature of the air in the system. The heated air travels through one or more pipes 250 and into one or more air distribution systems 252. Such an air distribution system 252 may be submerged in a body of liquid 254. When the hot air is delivered into the body of liquid, it forms bubbles, and increases the evaporation rate from the body of liquid. In this embodiment, the heater 248 may be an electric heater, a fossil-fired heater or a waste heat recovery heat exchanger, or any other appropriate heating device.

Figure 9:
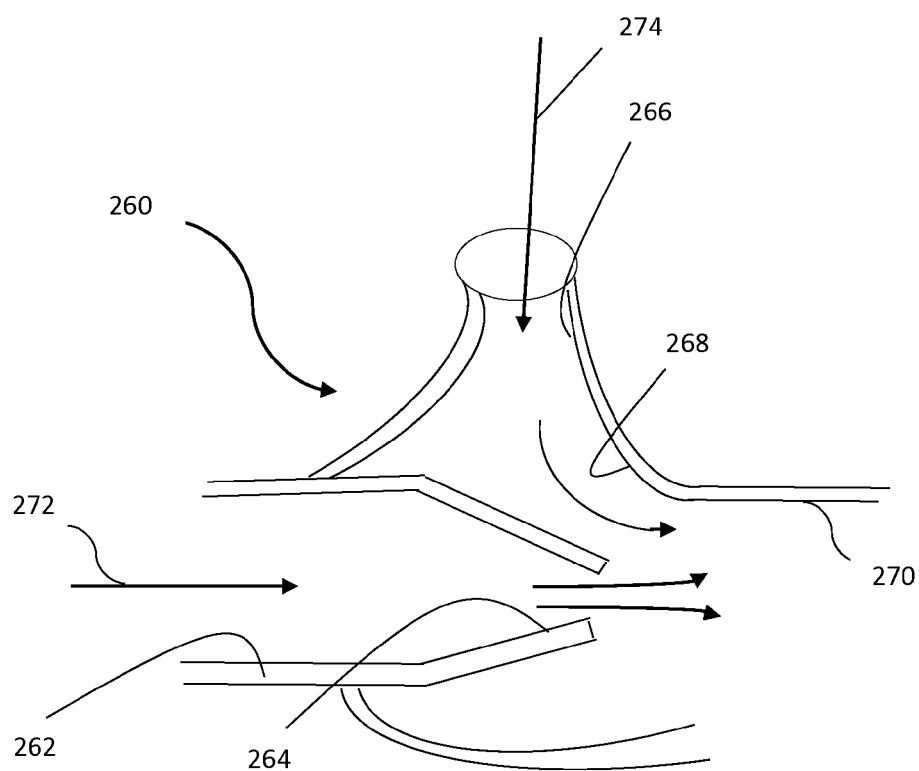
FIG. 9 shows an eductor or mixer that may be used in one or more of the evaporation systems described herein.

FIG. 9 shows an example of the mixer device that has been used in various embodiments above. Here, the mixer is a water eductor 260 that includes a conduit 262 for water (or other liquid) and a conduit 266 for air (or other gas). The conduit 262 includes a reduced-diameter nozzle 264 through which the water flows. Similarly, the conduit 266 includes a region 268 in the conduit 266 that surrounds (or partially surrounds) the exterior of the nozzle 264. The mixer 260 also includes a downstream conduit 270 through which the mixture of water and air flows. As can be appreciated, water 272 flows through the conduit 262 and nozzle 264. As it flows through the reduced-diameter nozzle, the water flowing therethrough speeds up (and thus its fluid pressure decreases, in keeping with the Bernoulli principle). This decrease in fluid pressure draws in air 274 through conduit 266 into region 268 and into the downstream conduit 270 where the air 274 is mixed with the water 272. In another example, the streams in the eductor may be swapped: air may flow through conduit 262, with water drawn in through conduit 266. The low pressure created by the nozzle 264 on the air stream forces the water to enter the eductor. A mixture of air and water is thus created and flows through conduit 270.

Figure 10:
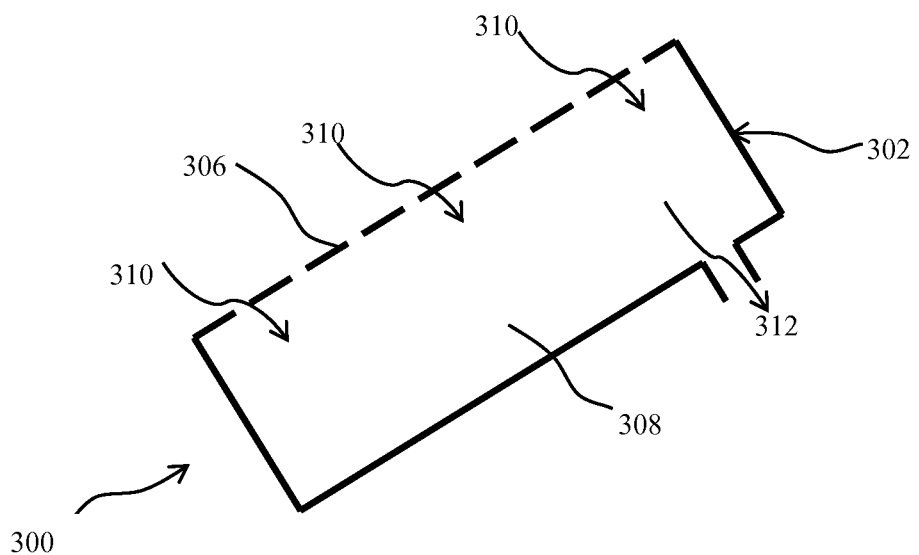
FIG. 10 shows a transpired solar collector for use with the techniques described herein.

FIG. 10 shows a transpired solar collector 300, which includes a box 302 that may be angled so one side faces the sun. That side of the box 302 may have a perforated wall 306. The perforated wall 306 may be selected/designed (such as via a dark paint) to absorb/retain solar energy. The interior 308 of the box 302 may also be selected to absorb and/or retain solar energy. Air 310 may be drawn in (via a pump, blower, or any other means for creating fluid flow or pressure differential) through the perforated wall 306, the interior 308, and out of a box outlet 312. As ambient air is drawn through these areas heated by solar radiation, the temperature of the air can be increased, perhaps by as much as 20 to 30 degrees C., or perhaps as much as 55 degrees C. or more. As can be appreciated, this is but one example of a type of transpired solar collector. Although not necessary, in some applications it may be desirable to use a dark absorber or cloth in lieu of the perforated wall 306.

Figure 11:
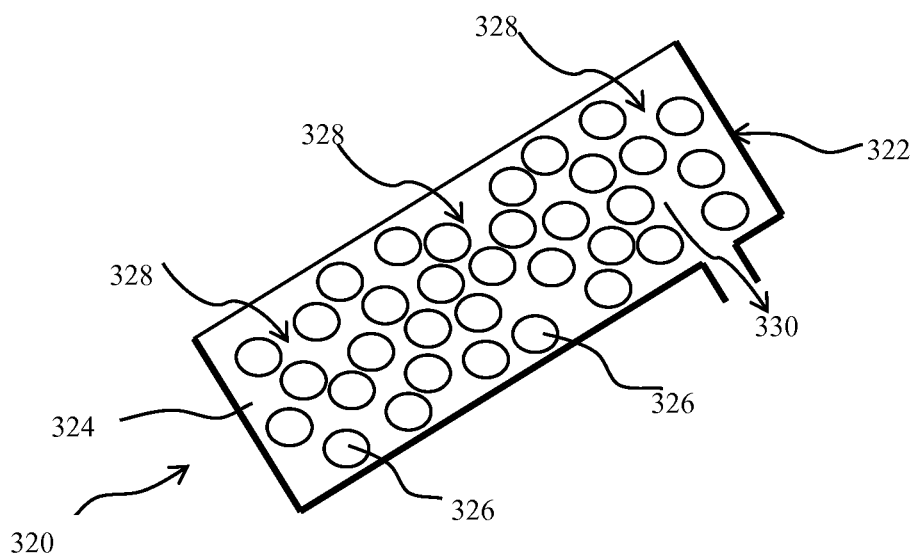
FIG. 11 shows a packed bed solar collector for use with the techniques described herein.

FIG. 11 shows a packed bed solar collector 320, which includes a box 322 that may be angled so one side faces the sun. The box 322 has an interior 324 containing a plurality of heat-absorbing items 326 (such as stones). Air 328 may be drawn in (via a pump, blower, or any other means for creating fluid flow or pressure differential) through the interior 324, across the heated items 326, and out of a box outlet 330. As ambient air is drawn through these areas heated by solar radiation, the temperature of the air can be increased. As can be appreciated, this is but one example of a type of packed bed solar collector.

Figure 12:
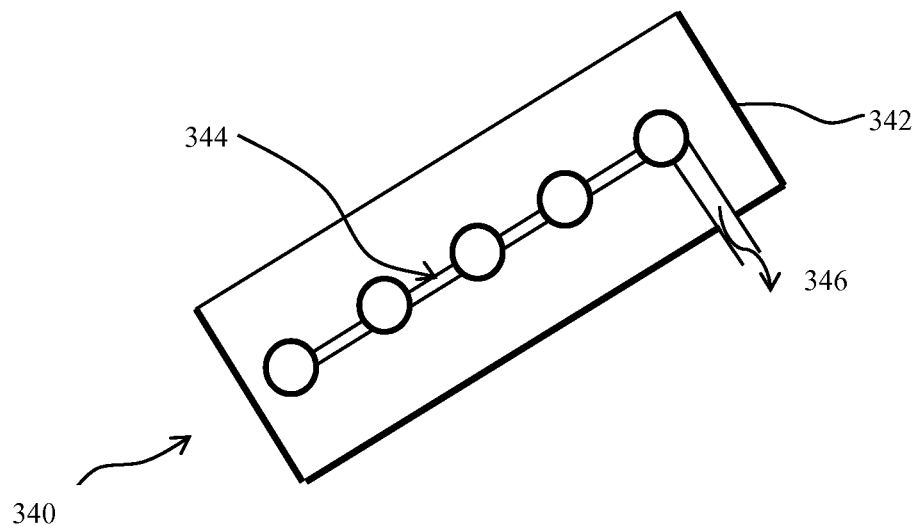
FIG. 12 shows a flat plate solar collector for use with the techniques described herein.

FIG. 12 shows a flat panel solar collector 340, which includes a box 342 (which may be shallower than boxes 302 and 322). Within the box may be a conduit network 344 through which a fluid may flow and exit through outlet 346. The fluid may be air or it may be a liquid to be heated and to then be passed to a heat exchanger where air may be flowed across the heat exchanger to heat the air.

Figure 13:
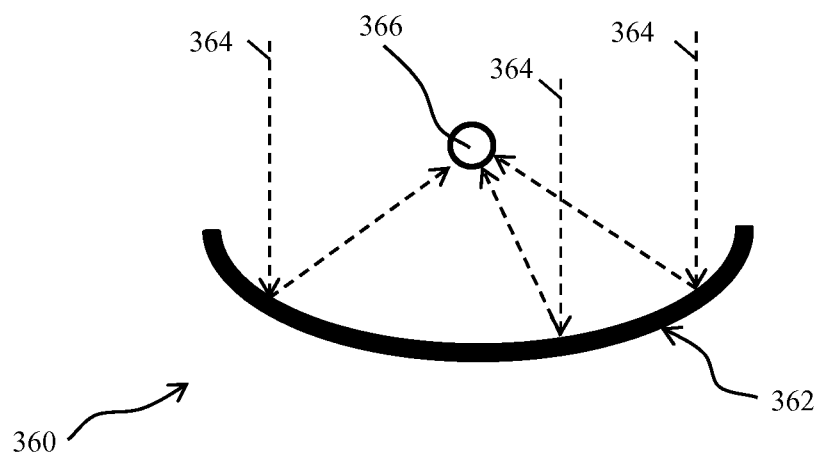
FIG. 13 shows a parabolic solar collector for use with the techniques described herein.

FIG. 13 shows a parabolic solar collector 360 which includes a mirror 362 or other reflector in the shape of a parabola. Incoming light rays 364 are shown to reflect off the mirror 362 and be re-directed toward the focus of the parabola. Located at the focus of the parabola is a pipe 366 through which some fluid flows (air or liquid, as described above). The pipe 366 and the fluid contents therein are heated in this manner.

Figure 14:
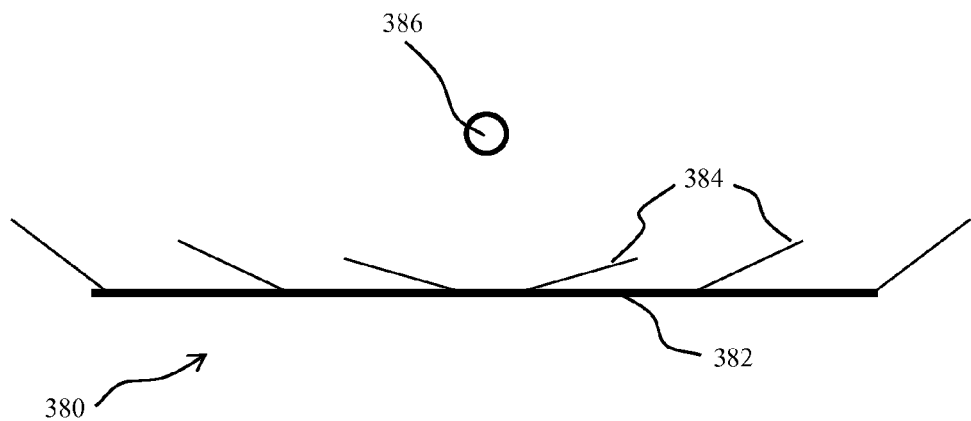
FIG. 14 shows a linear Fresnel solar collector for use with the techniques described herein.

FIG. 14 shows a linear Fresnel collector 380, which includes a substrate 382 that supports a plurality of separate reflectors 384. The reflectors 384 are all angled differently, so that each one reflects incoming sunlight to the same region, where a pipe 386 is located. The pipe 386 and the fluid contents therein are heated in this manner.

Figure 15:
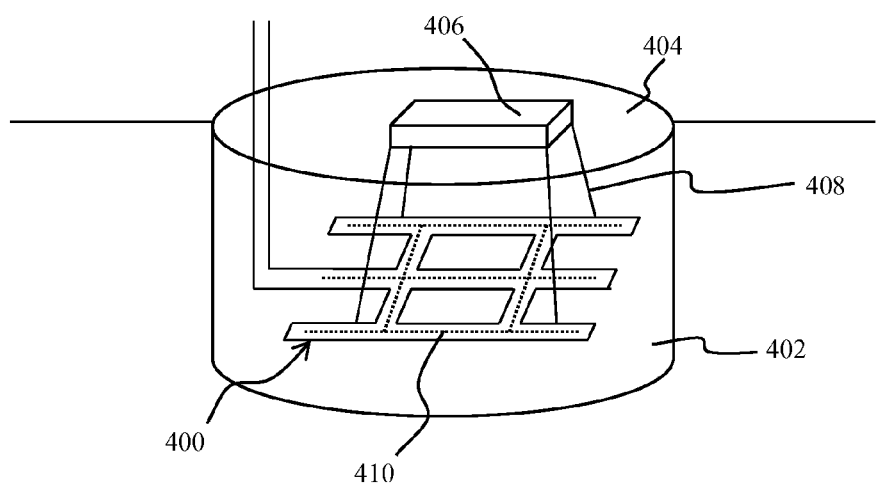
FIG. 15 shows a pipe distribution network for use with the techniques described herein.

FIG. 15 shows a pipe distribution network 400 that can be used with any of the techniques discussed herein. It is shown here in an evaporation pond 402 having an upper surface 404. A flotation device 406 (of which there could be any number and in any arrangement) is associated with the pipe distribution network 400, and in this case is shown to support the network 400 by a plurality of supports or lines 408 (which could be made of most any suitable material). The network 400 also includes a plurality of small holes 410 therein so that the air (and potentially other fluid) can escape the network 400 and enter the pond 402. The holes could be any appropriate size, although holes in the range of 1 mm to 3.2 mm have been found to work well.

Figure 16:
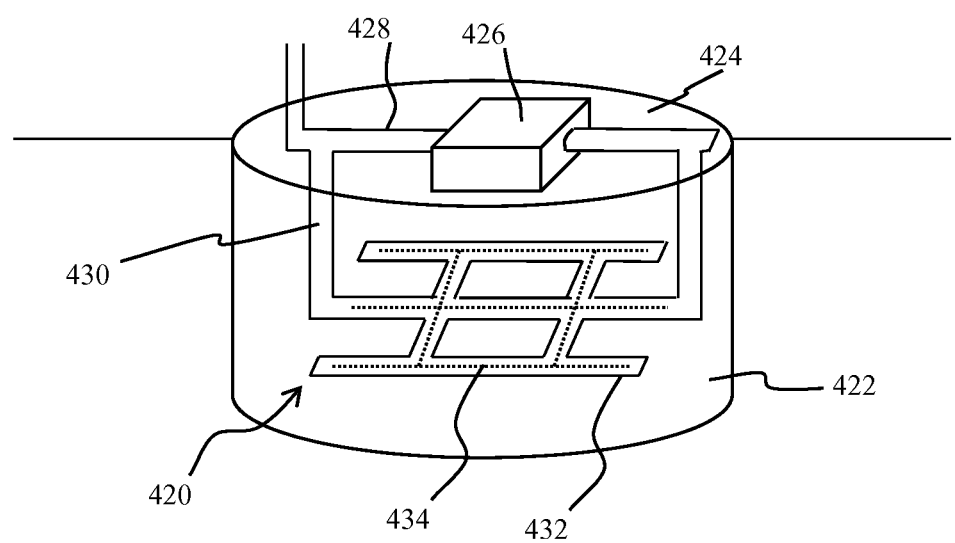
FIG. 16 shows an alternative pipe distribution network for use with the techniques described herein.

FIG. 16 shows a pipe distribution network 420 that can be used with any of the techniques discussed herein. It is shown here in an evaporation pond 422 having an upper surface 424. A flotation device 426 (of which there could be any number and in any arrangement) is associated with the pipe distribution network 420, and in this case is shown to support the network 420 by direct contact with one or more portions of the network 420. The network 420 includes upper, horizontal pipes 428, vertical pipes 430, and exit pipes 432. The exit pipes 432 include a plurality of small holes 434 therein so that the air (and potentially other fluid) can escape the network 420 and enter the pond 422.

There is a range of practical depths for the holes 410 and 434 below the upper surfaces 404 and 424, respectively. If the holes are too close to the surface, the evaporation rate is not significantly increased over the ambient evaporation rate. On the other hand, if the holes are too far below the surface, the pressure difference between the surface and at the location of the holes will be so great as to require a great deal of pumping power and thus energy usage. As can be appreciated, there is a trade-off between these two parameters. Initial experiments indicate that a range of 1 to 3 feet below the surface my work well. Nevertheless, these techniques apply at all possible depths.

As can be appreciated, the various techniques disclosed herein increase the evaporation rate by exposing the water in the evaporation pond to air bubbles. By having more water molecules in contact with air, the evaporation rate is improved over a still pond. In addition, the air bubbles have an elevated temperature relative to the ambient air temperature. The evaporation rate is related to the ambient air temperature. Thus, using heated air bubbles effectively increases the ambient air temperature, thus increasing the evaporation rate. Further, compared with sprayer systems, injecting air reduces the operational costs as the system offers lower pressure drop, and no scaling occurs within the ducts that bring the air into the evaporation pond.

There are many alternatives to the specifics discussed herein. For one thing, any of the features shown in any of the discussion provided herein could be incorporated into or combined with any other feature or design discussed herein. As a further example, any of the functionality of any of the described components could be combined with other components or further separated.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A method for enhancing the evaporation rate of water in an evaporation pond having an upper surface, the method comprising:
    drawing in ambient air, the ambient air having an ambient air temperature;
    raising the temperature of the air to a temperature relatively higher than the ambient air temperature; and
    injecting the air at the relatively higher temperature directly into the evaporation pond at multiple points in the evaporation pond that are below the upper surface of the evaporation pond, wherein the multiple points in the evaporation pond are spaced apart from each other in regular intervals at distributed points within the pond.

2. A method as defined in claim 1, wherein the temperature of the air is raised via solar heating.

3. A method as defined in claim 2, wherein the temperature of the air is raised by passing the air through a transpired solar collector.

4. A method as defined in claim 2, wherein the temperature of the air is raised by passing the air through a packed bed solar collector.

5. A method as defined in claim 2, wherein the temperature of the air is raised by passing the air through a parabolic solar collector.

6. A method as defined in claim 2, wherein the temperature of the air is raised by passing the air through a linear Fresnel solar collector.

7. A method as defined in claim 1, wherein the temperature of the air is raised via electrical heating.

8. A method as defined in claim 1, wherein the temperature of the air is raised via heating by burning fuel.

9. A method as defined in claim 1, wherein the temperature of the air is raised via waste heat recovery.

10. A method as defined in claim 1, wherein the air is injected into the evaporation pond via an air pump.

11. A method as defined in claim 1, wherein the air is injected into the evaporation pond at a plurality of points in the evaporation pond by a pipe network.

12. A method as defined in claim 11, wherein the pipe network is maintained at a fixed depth in the evaporation pond below the upper surface of the evaporation pond.

13. A method as defined in claim 12, wherein the pipe network is maintained at the fixed depth by one or more flotation devices associated therewith.

14. A method as defined in claim 12, wherein the fixed depth of the pipe network below the upper surface of the evaporation pond is between 1 and 3 feet.

15. A system for enhancing the evaporation rate of water in an evaporation pond having an upper surface, the system comprising:
    an air pump that draws in ambient air, the ambient air having an ambient air temperature;
    a heater that raises the temperature of the drawn in air to a temperature relatively higher than the ambient air temperature; and
    a pipe network with interior passageways in fluid communication with the air pump to receive the drawn in heated air, wherein the pipe network includes sections thereof that are submerged into the evaporation pond and perforated to allow the heated air to escape from the interior passageways to an exterior of the pipe network and interact with the water in the evaporation pond, wherein the interaction of the heated air and the water in the evaporation pond takes place outside of the confines of the system.

* * * * *